(12) United States Patent
Harada

(10) Patent No.: US 7,487,755 B2
(45) Date of Patent: Feb. 10, 2009

(54) AIR-INTAKE DEVICE FOR INTERNAL COMBUSTION ENGINE

(75) Inventor: Toshikazu Harada, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 11/667,662

(22) PCT Filed: Nov. 7, 2006

(86) PCT No.: PCT/IB2006/003135

§ 371 (c)(1),
(2), (4) Date: May 14, 2007

(87) PCT Pub. No.: WO2007/054779

PCT Pub. Date: May 18, 2007

(65) Prior Publication Data

US 2008/0098976 A1 May 1, 2008

(30) Foreign Application Priority Data

Nov. 8, 2005 (JP) .............................. 2005-323468

(51) Int. Cl.
*F02M 35/12* (2006.01)
(52) U.S. Cl. .......................... 123/184.57; 123/184.59; 123/184.36
(58) Field of Classification Search ............ 123/184.21, 123/184.26, 184.36, 184.44, 184.49, 184.53, 123/184.55, 184.56, 184.57, 185.59
See application file for complete search history.

(56) References Cited

U.S. PATENT DOCUMENTS

| 5,156,116 | A * | 10/1992 | Scherenberg | 123/184.44 |
|---|---|---|---|---|
| 6,192,850 | B1 * | 2/2001 | Rutschmann et al. | 123/184.57 |
| 6,250,272 | B1 * | 6/2001 | Rutschmann et al. | 123/184.57 |
| 6,431,136 | B2 * | 8/2002 | Pietrowski et al. | 123/184.59 |
| 6,732,509 | B2 * | 5/2004 | Shiga | 60/312 |
| 7,077,093 | B2 * | 7/2006 | Koelmel et al. | 123/184.57 |
| 7,350,496 | B2 * | 4/2008 | Nakayama et al. | 123/184.57 |
| 7,353,791 | B2 * | 4/2008 | Sasaki et al. | 123/184.57 |
| 2006/0283658 | A1 * | 12/2006 | Abe et al. | 181/204 |
| 2007/0131189 | A1 * | 6/2007 | Shinada et al. | 123/184.57 |

FOREIGN PATENT DOCUMENTS

| DE | 40 32 321 A1 | 4/1991 |
|---|---|---|
| EP | 0 352 820 A2 | 1/1990 |
| JP | 05 332143 A | 12/1993 |
| JP | 11-117750 A | 4/1999 |
| JP | 2007-132200 | * 5/2007 |

* cited by examiner

*Primary Examiner*—Hai H Huynh
(74) *Attorney, Agent, or Firm*—Kenyon & Kenyon LLP

(57) ABSTRACT

For a V-type engine which has an independent air-intake system for each one of banks, a vibration plate unit is disposed in the interior of a resonance conduit for obtaining the beneficial effects of resonant supercharging. In this vibration plate unit, a plate member made from metal is fitted in the interior of the resonance conduit via a support member made from rubber, and thereby it is arranged, while blocking mutual flow of air between the banks, also to obtain the beneficial effects of resonant supercharging by enabling the mutual transmission of pressure between surge tanks.

5 Claims, 4 Drawing Sheets

AIR-INTAKE DEVICE FOR INTERNAL COMBUSTION ENGINE

INCORPORATED BY REFERENCE

This is a 371 national phase application of PCT/IB2006/003135 filed 7 Nov. 2006, claiming priority to Japanese Patent Application No. 2005-323468 filed 8 Nov. 2005, the contents of which are incorporated herein by reference.

BACKGROUND OF THE INVENTION

1. Field of the Invention

The present invention relates to an air-intake device for an internal combustion engine, as represented by an engine for an automobile or the like. In particular, the present invention relates to a countermeasure for making it possible, with an internal combustion engine equipped with a plurality of groups of cylinders such as a V-type internal combustion engine or the like, to manifest the beneficial effects of resonant supercharging, while still adequately maintaining the air/fuel ratio of the mixture gas in each cylinder.

2. Description of the Related Art

An internal combustion engine (an engine) like the ones disclosed in, for example, Japanese Patent Application Publications Nos. JP-A-5-332143 or JP-A-11-117750, equipped with an air-intake system which takes advantage of the beneficial effects of resonant supercharging, is per se known. In detail, surge tanks which are provided to each of the banks of, for example, a V-type engine are communicated together by a communication conduit (a resonance conduit). In the interior of this communication conduit, there is provided an opening and closing valve (a resonance valve). And this opening and closing valve is opened in the engine speed region in which the beneficial effects of resonant supercharging are considered to be required, so that, by the surge tanks communicating with one another via the communication conduit, it is arranged for the effects of resonant supercharging to be manifested. By doing this, with an engine which takes advantage of the beneficial effects of inertial supercharging, it becomes possible by the effects of resonant supercharging, for example, to eliminate downturn of the torque in a specified engine speed region in which these effects of inertial supercharging cannot be sufficiently obtained.

Furthermore, the above described V-type engine is known as one engine configuration. As one type of air-intake system for such a V-type engine, there is known one which comprises a independent air-intake system for each bank (a dedicated air-intake system for each bank). In other words it comprises, for each bank independently, an air-intake system which comprises, in order from the upstream side of the intake passage, an air cleaner, an air flow meter, a throttle valve, a surge tank, and an intake manifold; i.e., two air-intake systems. If an independent air-intake system is provided for each bank in this manner, it is possible to obtain a comparatively large air cleaner volume with respect to the amount of air which is to be inducted into each of the banks, and accordingly it is possible to reduce the pressure loss in the air-intake system. Due to this, there is the beneficial effect that it is possible sufficiently to ensure the amounts of air charged into the cylinders. Furthermore, it is possible to detect the amount of intake air into each of the banks separately and moreover accurately with its own corresponding air flow meter. Because of this, there is also the beneficial effect that it becomes possible to bring the actual air/fuel ratio (A/F) for each of the banks close to the target A/F at high accuracy. It should be understood that, with an engine which is equipped with this type of air-intake system, an ECU is provided to each bank in order to control the fuel injection amounts to the injectors and the ignition timings of the spark plugs, and it is arranged to be able to ensure the controllability of the above described fuel injection amounts and ignition timings in a satisfactory manner.

Now, when an air-intake system which takes advantage of the above described resonant supercharging effect is applied to a V-type engine which is equipped with the above described type of air-intake system having two independent systems, malfunctioning such as described below can occur.

That is to say, with an air-intake system which takes advantage of the resonant supercharging effect, the opening and closing valve is opened in the engine speed region in which this resonant supercharging effect is required, and the surge tanks are communicated together by the communication conduit. In other words, flow of air from each one of the banks to the other becomes possible via the communication conduit. In this case, in a situation in which the internal pressures inside the surge tanks are mutually different, air comes to flow from that surge tank whose internal pressure is high towards that surge tank whose internal pressure is low. In other words, on the one hand, the amount of intake air to the cylinders which are connected to that surge tank whose internal pressure is high is decreased by the amount of this air inflow described above, while, on the other hand, the amount of intake air to the cylinders which are connected to that surge tank whose internal pressure is low is increased by the amount of this air inflow described above. Since this phenomenon is created on the downstream side of the above described air flow meters, a deviation occurs in the amounts of intake air which are actually sucked into the cylinders of each bank with respect to the amounts of intake air which are detected by the air flow meters provided to each of the banks, which is undesirable. Moreover, for each cylinder of each bank, its fuel injection amount is determined according to its intake amount as detected by the air flow meter at its respective upstream side. Due to this, for those cylinders for which the amount of intake air has decreased by just the amount of the above described air inflow, the A/F comes to deviate to the rich side with respect to the target A/F. On the other hand, for those cylinders for which the amount of intake air has increased by just the amount of the above described air inflow, the A/F comes to deviate to the lean side with respect to the target A/F.

As a result, a satisfactory state of combustion of the mixture gas inside the cylinders cannot be obtained. Not only does this decrease the engine output, but there is also something of inviting malfunctioning, in which it becomes impossible to maintain the temperature of a catalytic converter which is provided in the exhaust system at an adequate temperature so that it becomes impossible to obtain a sufficient performance therefrom, or in which the spark plugs get into a state of being wetted with fuel in the liquid phase (the so called flooded state of the spark plugs) so that the state of ignition of the mixture gas deteriorates, or the like.

SUMMARY OF THE INVENTION

The object of the present invention is to provide an air-intake device for an internal combustion engine which can maintain the air/fuel ratio of the mixture gas in an adequate manner for an engine which is provided with a plurality of cylinder groups and with an independent air-intake system for each of the cylinder groups, while being applicable to an air-intake system which manifests the beneficial effects of resonant supercharging.

In the theory of the present invention for solving this problem, with an internal combustion engine which is equipped with independent air-intake systems for each cylinder group, within a resonant passage which is arranged to span between the air-intake systems in order to obtain the beneficial effects of resonant supercharging, there is provided a means which is capable of mutually transmitting pressure between the air-intake systems while preventing the mutual flow of air between the air-intake systems; and thereby, by equalizing the pressures in each of the air-intake systems by this pressure transmission, it is arranged to obtain the beneficial effects of resonant supercharging.

A first aspect of the present invention relates to an air-intake device for an internal combustion engine which includes a plurality of cylinder groups, intake passages that are provided for each of these cylinder groups and are mutually independent, and a resonant supercharging means which includes a resonance passage joining between the intake passages for each of the cylinder groups and an opening and closing valve provided in this resonance passage and driven to open and close, and which is capable of adjusting the air/fuel ratio of the mixture gas to each of the cylinder groups according to the amounts of intake air sucked into the above described intake passages. And this air-intake device for an internal combustion engine includes a vibration plate which is provided within the above described resonance passage, and which, while intercepting mutual flow of intake air between the intake passages of the various cylinder groups, is also capable of mutual transmission of pressure between the intake passages of the various cylinder groups.

Furthermore, the above described air-intake device may further include an intake air amount detection means which, for each cylinder group, detects the amount of intake air being sucked from the intake passage. And this air-intake device may be made so as to be able, for each cylinder group, to set a fuel injection amount and to adjust the air/fuel ratio, according to the amount of intake air to each cylinder group which is thus detected by the above described intake air amount detection means.

According to this first aspect of the present invention, when, for example, the engine speed of the internal combustion engine reaches the engine speed region in which the beneficial effects of resonant supercharging are considered to be required, the opening and closing valve of the resonant supercharging means is opened. By doing this, the pressures in the intake passages provided to each of the cylinder groups come to operate on both sides of the vibration plate. Accordingly, the vibration plate vibrates according to this pressure difference, so that the internal pressure in the intake passage on its side on which the internal pressure is high comes to be transmitted to the intake passage on the side on which the internal pressure is low. Due to this, the internal pressures in the various intake passages are equalized, and the beneficial effects of resonant supercharging are manifested. Furthermore, in this state in which the beneficial effects of resonant supercharging are manifested, the interior of the resonance passage is partitioned by the vibration plate, so that a situation does not take place in which the intake air in one of the intake passages flows into the other intake passage, which would be undesirable. In other words, since the mutual flow of intake air between the various cylinder groups does not take place, accordingly intake air flows in the amounts which have been detected at the upstream sides within each of the intake passages come to flow into the corresponding cylinder groups just as they are, so that the amounts of intake air do not fluctuate, and no deviation takes place in the air/fuel ratio of the mixture gas.

Furthermore, a surge tank may be provided in the intake passage for each of the cylinder groups, as a connection spot for the resonance passage. By doing this, when the opening and closing valve is opened, the beneficial effect of pressure equalization of the pressures within the intake passages due to vibrations of the vibration plate is exerted upon the surge tanks, whose volumes are comparatively great. Because of this, a high beneficial effect of resonant supercharging is manifested.

With regard to the structure of the above described vibration plate in concrete terms, the following suggestions are offered. The vibration plate may include a support member which has flexibility, and a plate member which is made from metal, resin, or wood pulp, approximately the entirety of the outer peripheral edge of the plate member is supported by the inner circumferential surface of the resonance passage via the support member. And, while the support member deforms elastically according to pressure difference within the resonance passage on both sides of the plate member, the plate member may reciprocate within the resonance passage so as to equalize the pressures in the intake passages of each of the cylinder groups. Due to this, pressure transmission comes to be performed in a satisfactory manner from the intake passage whose internal pressure is high to the intake passage whose internal pressure is low, and it is possible, with a comparatively simple structure, to make the maintenance of appropriate air/fuel ratios and the beneficial effects of high resonance supercharging mutually compatible.

With the present invention, it becomes possible to apply an air-intake system which manifests the beneficial effects of resonant supercharging to an engine which is provided with a plurality of cylinder groups and moreover with an independent air-intake system for each of the, cylinder groups, without deviation of the air/fuel ratio of the mixture gas.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein:

FIG. 4 is a block diagram showing the structure of a control system such as an ECU or the like.

DETAILED DESCRIPTION OF THE PREFERRED EMBODIMENTS

In the following, the first embodiment of the present invention will be explained based upon the drawings. In this embodiment described below, a case is explained in which the present invention has been applied to a V-type eight cylinder engine (an internal combustion engine) for an automobile.

Explanation of the Overall Structure of the Engine

Figure 1:
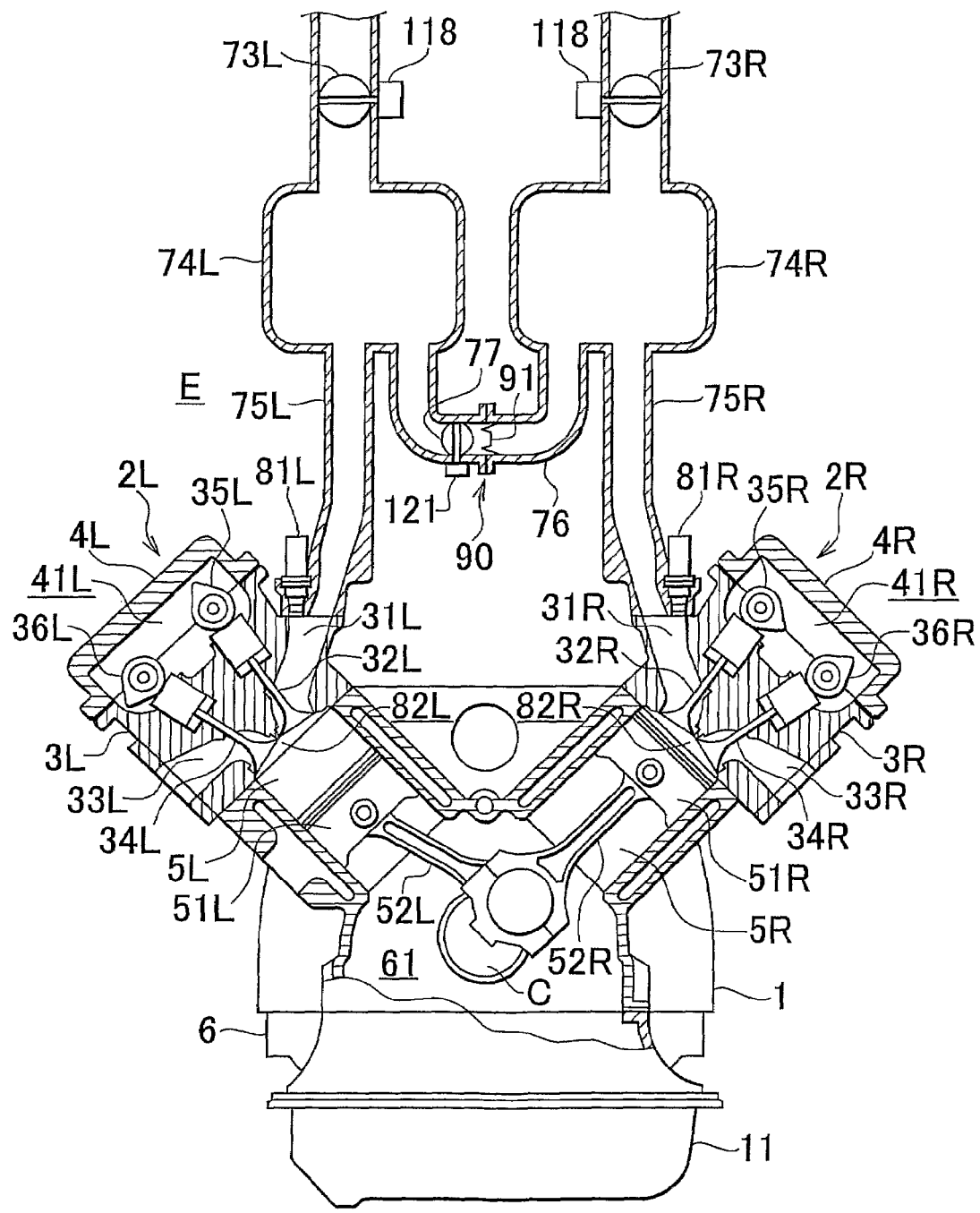
FIG. 1 is a general structural figure showing the interior of a V-type engine according to the first embodiment, as seen along the axial direction of the crank shaft.
Figure 2:
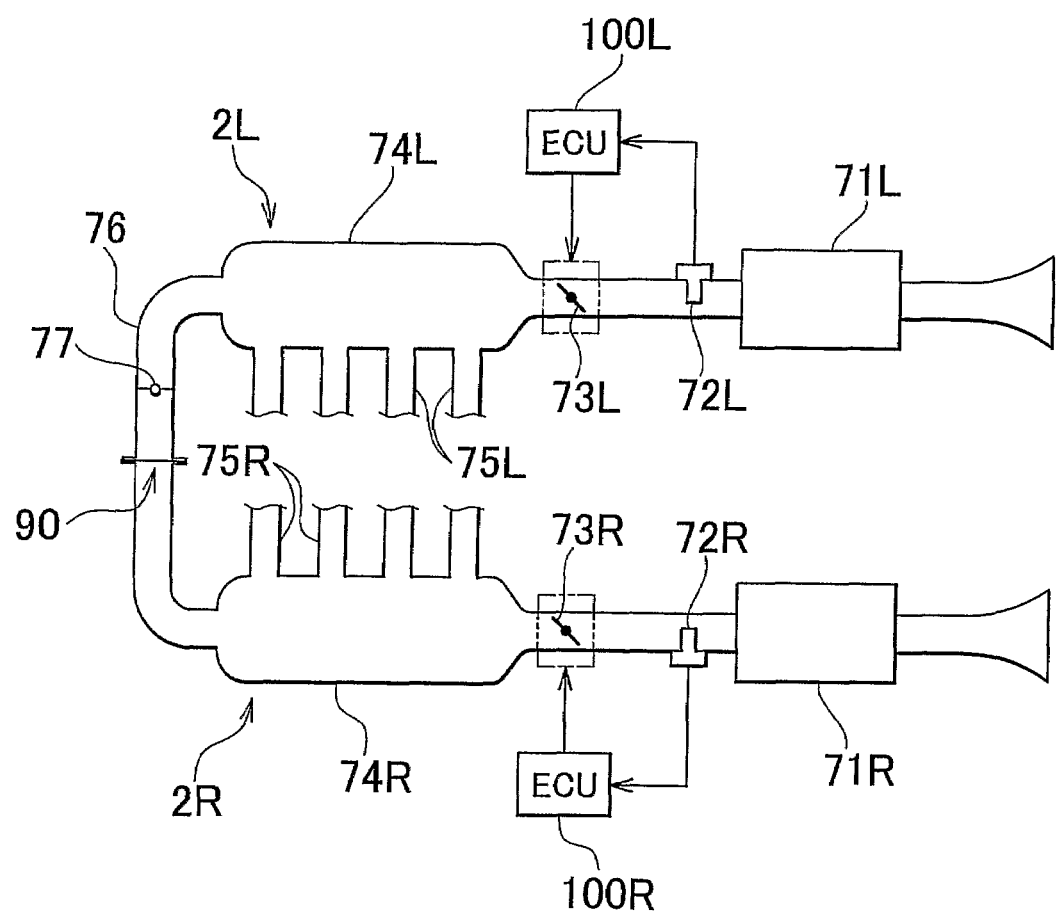
FIG. 2 is a structural system diagram showing this engine and its air-intake system.

FIG. 1 is a general structural figure showing the interior of a V-type engine E according to this embodiment, as seen along the direction of the axis of the crank shaft C. Moreover, FIG. 2 is a structural system diagram showing the air-intake system of this engine E. It should be understood that, in FIG. 1, in order to make it easier to understand the structure of this air-intake system, intake manifolds 75L, 75R and surge tanks 74L, 74R are shown as elongated upwards from the engine E.

As shown in these figures, this V-type engine E comprises a pair of banks (cylinder groups) 2L, 2R which project upward from the upper portion of a cylinder block 1 in a V-type configuration. Each of these banks 2L, 2R comprises respective cylinder heads 3L, 3R which are installed upon upper end portions of the cylinder block 1, and respective head covers 4L, 4R which are fitted upon their upper ends. A plurality of cylinders 5L, 5R (for example four for each of the banks 2L, 2R) are arranged upon the above described cylinder block 1 so as to subtend a predetermined angle (for example 90°). Pistons 51L, 51R are received in the interiors of these cylinders 5L, 5R so as to be able to reciprocate therein. Furthermore, each of these pistons 51L, 51R is linked to the crank shaft C via a connecting rod 52L, 52R so as to be able to transmit power thereto. Moreover, a crank case 6 is fitted below the cylinder block 1. The space from the lower portion of the interior of the above described cylinder block 1 through the interior of the crank case 6 constitutes a crank chamber 61. Yet further, an oil pan 11 is also provided below this crank case 6, and constitutes an oil accumulation unit.

Furthermore, intake valves 32L, 32R for opening and closing intake ports 31L, 31R and exhaust valves 34L, 34R for opening and closing exhaust ports 33L, 33R are fitted to the above described cylinder heads 3L, 3R respectively. It is arranged for the opening and closing operation of these various valves 32L, 32R, 34L, 34R to be performed by the rotation of cam shafts 35L, 35R, 36L, 36R which are provided in cam chambers 41L, 41R which are formed between the cylinder heads 3L, 3R and the head covers 4L, 4R.

Next, the air-intake system of the engine E according to this embodiment will be explained. As the air-intake system of this engine E, there are provided two mutually independent systems corresponding to the banks 2L, 2R. In other words, as shown in FIG. 2, air-intake systems which comprise, from their upstream sides along their intake flow directions, air cleaners 71L, 71R, air flow meters (amount of intake air detection means) 72L, 72R, throttle valves 73L, 73R which are provided within throttle bodies, surge tanks 74L, 74R, and intake manifolds 75L, 75R are fitted independently to the banks 2L, 2R respectively. As a beneficial effect obtained by providing independent air-intake systems for each of the banks 2L, 2R in this manner, it is possible to obtain comparatively large volumes for the air cleaners 71L, 71R with respect to the amount of air which is sucked into the banks 2L, 2R respectively, so that it is possible to reduce the intake pressure loss. And it is suggested that the charge amount of air into the cylinders can be sufficiently ensured. Furthermore, it is possible to detect at high accuracy the intake amounts for the banks 2L, 2R with the air flow meters 72L, 72R, respectively. Due to this, the beneficial effect may also be cited that it becomes possible to make the actual air/fuel ratio (A/F) for each of the banks 2L, 2R approach to the target A/F with high accuracy. It should be understood that, with an engine E which is provided with this type of air-intake system, ECUs 100L, 100R are provided to the banks 2L, 2R for controlling the fuel injection amounts for injectors 81L, 81R and the ignition timings of the spark plugs. By doing this the control burden for each of the ECUs 100L, 100R is alleviated, and furthermore it is arranged that the controllability of the above described fuel injection amounts and ignition timings is ensured in a satisfactory manner.

Furthermore, an air-intake system (a resonant supercharging means) which takes advantage of the beneficial effects of resonant supercharging is employed as the air-intake system of the engine E according to this embodiment. In concrete terms, as shown in FIG. 2, surge tanks 74L, 74R which are provided to each of the banks 2L, 2R are connected together by a resonance conduit (resonance passage) 76. And a resonance valve 77 is provided in the interior of this resonance conduit 76. This resonance valve 77 consists of a butterfly valve which can change over between the fully opened state and the fully closed state, and which is opened when the engine has arrived at an engine speed region in which the beneficial effects of resonant supercharging are considered to be necessary. Furthermore, as for the position in which this resonance valve 77 is disposed, it is set up at a position which is slightly towards the left side bank 2L from the central position of the above described resonance conduit 76 in its axial line direction (the direction in which the conduit extends). It should be understood that it would also be acceptable to arrange for this resonance valve 77 to be arranged towards the right side bank 2R.

And, as the defining characteristic of this engine E according to this embodiment, in the interior of the above described resonant conduit 76, there is disposed a vibration plate unit (a vibration plate) 90 at a central position of this resonance conduit 76 in its axial line direction (the direction in which the conduit extends). This vibration plate unit 90 will now be explained in the following.

Figure 3:
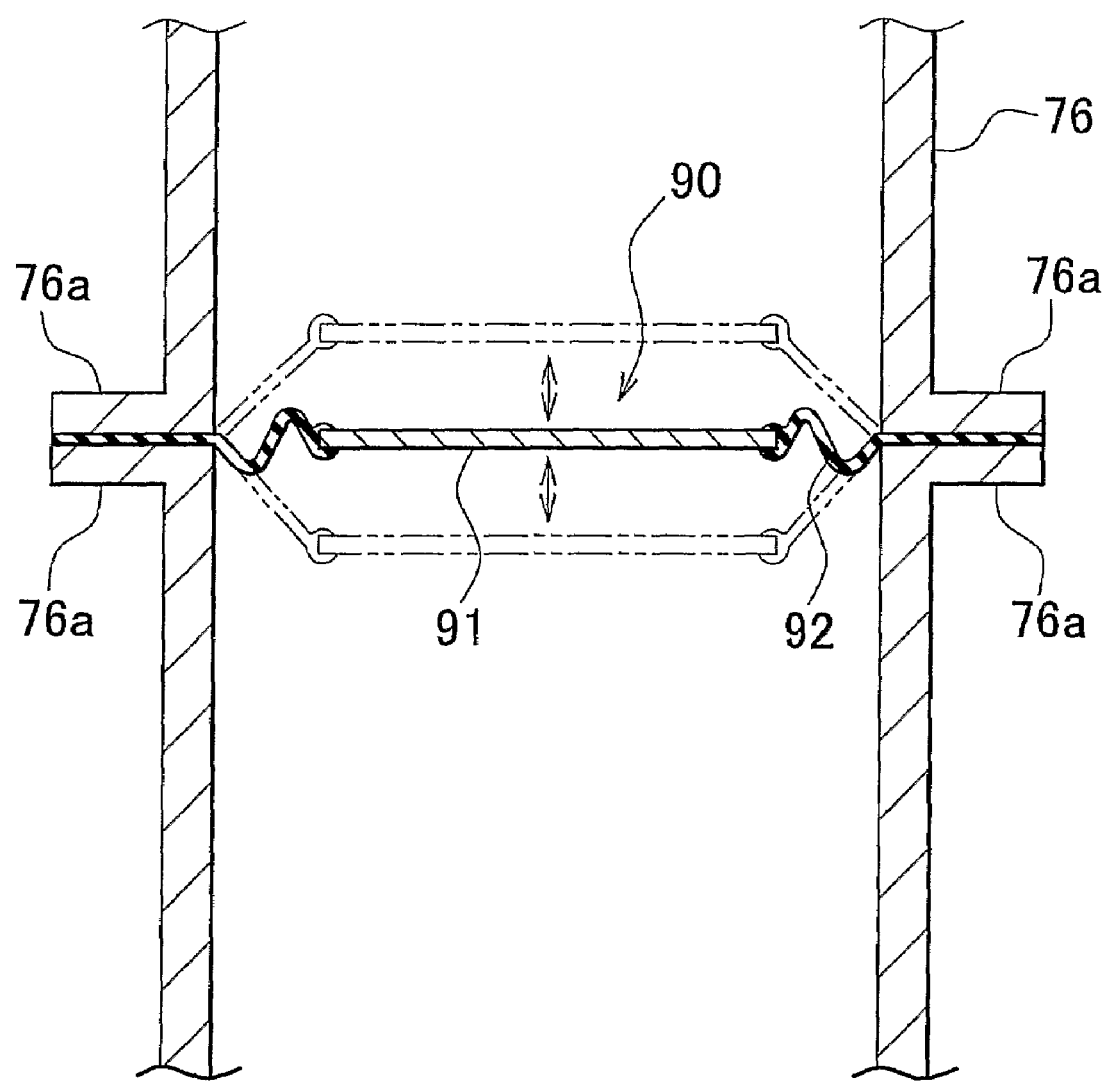
FIG. 3 is a sectional view of a resonance conduit at a spot where a vibration plate unit is disposed.

FIG. 3 is a sectional view of the resonance conduit 76 at the spot where the vibration plate unit 90 is disposed. As shown in this FIG. 3, the vibration plate unit 90 comprises a plate member 91 which is made as a thin circular metallic plate whose external diameter dimension is set to be slightly smaller than the internal diameter dimension of the resonance conduit 76, and a support member 92 which is made from rubber and which has an approximately ring shape, disposed around the entire outer periphery of the plate member 91.

And on the one hand the inner peripheral edge of the above described support member 92 contacts the outer peripheral edge of the plate member 91, while on the other hand the outer peripheral edge of the support member 92 is fixed at a connecting spot partway along the resonance conduit 76, in a state of being sandwiched between two connection flanges 76a, 76a. In other words, the plate member 91 is attached to the inner surface of the resonance conduit 76 via the support member 92, which has flexibility. Furthermore, the cross sectional shape of this support member 92 can be deformed in the direction along the axial line of the resonance conduit 76 (the vertical direction in FIG. 3), so that it assumes an approximately bellows shape.

The vibration plate unit 90 is disposed in the interior of the resonance conduit 76 in this manner. This plate member 91 is built so as to be able, when an external-force (in concrete terms, air pressure accompanying intake pulsations) acts upon the plate member 91, to shift in the direction parallel to the direction along the axial line of the resonance conduit 76 (for example through around 20 mm), along with the support member 92 undergoing elastic deformation (refer to the virtual lines and the arrow sign in FIG. 3). This operation along with the shifting of the plate member 91 will be described hereinafter.

Injectors (fuel injection valves) 81L, 81R are provided to the above described intake manifolds 75L, 75R respectively, and air which is inducted into the intake manifolds 75L, 75R is mixed with fuel which is injected into the manifolds 75L, 75R from these injectors 81L, 81R, thus forming mixture gas which is inducted into the combustion chambers 82L, 82R along with the opening of the intake valves 32L, 32R. Furthermore, spark plugs are disposed at the heads of these combustion chambers 82L, 82R. Moreover, the combustion gas which is generated by the combustion of the mixture gas in the above described combustion chambers 82L, 82R due to ignition by the spark plugs, is discharged into the exhaust manifold as exhaust gas along with the opening of the exhaust valves 34L, 34R.

The ECU

The operation of the engine E which has a structure like that described above is controlled by ECUs (electronic control units) 100L, 100R. With the engine E according to this embodiment, ECUs 100L, 100R are provided to each of the banks 2L, 2R, so that it is arranged for the banks 2L, 2R to be controlled independently. Since both of the ECUs 100L, 100R have approximately the same structure, the ECU 100L for the left side bank 2L will now be explained, as a representative.

Figure 4:
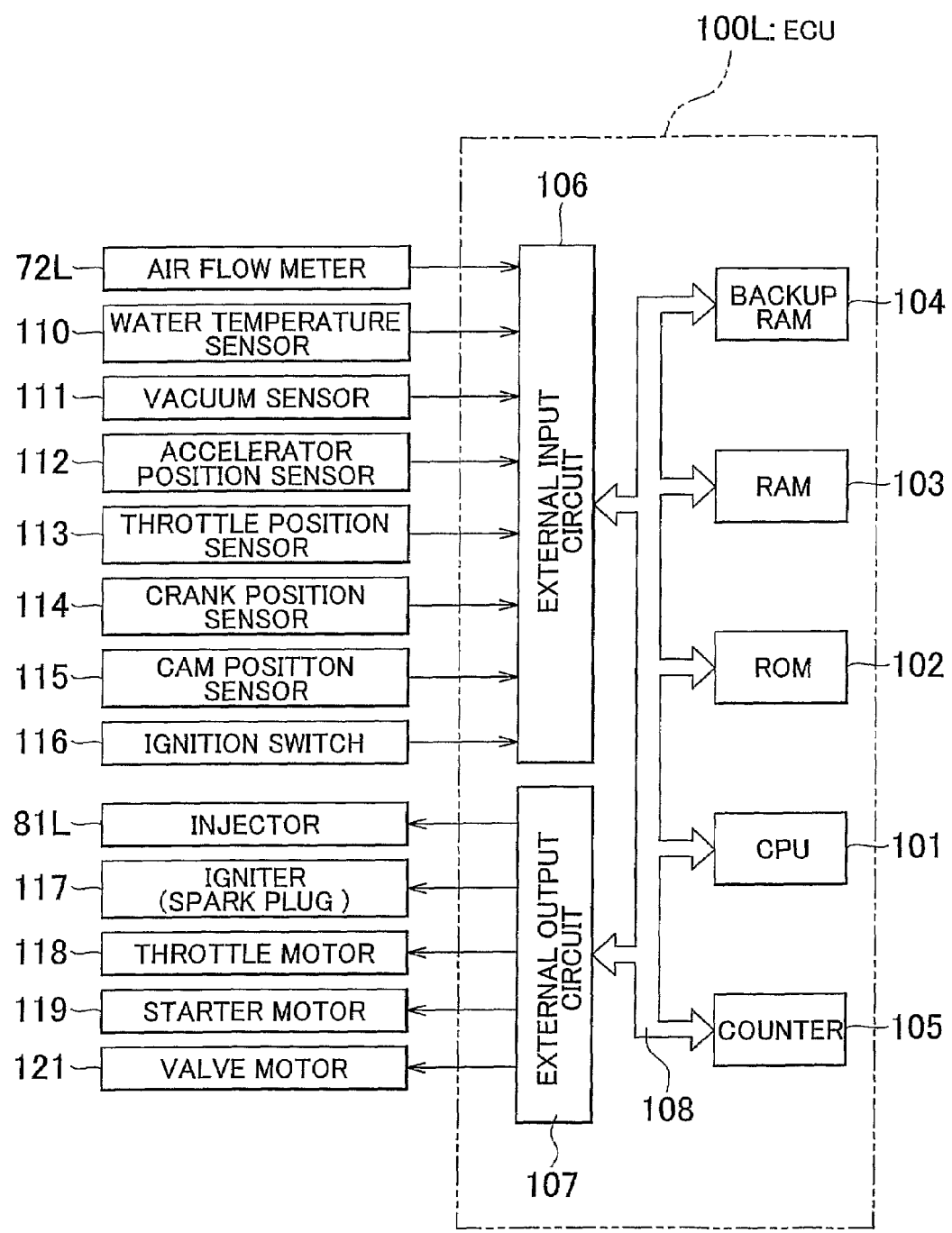

As shown in FIG. 4, this ECU 100L comprises a CPU 101, a ROM 102, a RAM 103, a backup RAM 104, and a counter 105 which counts the number of times of fuel injection or the like.

In the ROM 102 described above, there are stored various types of control program and maps and the like which are referred to when executing these various control programs. The CPU 101 performs calculation processing based upon these various types of control program and maps which are stored in this ROM 102. The above described RAM 103 is a memory which temporarily stores the results of calculations by the CPU 101 and data which has been inputted from various sensors and the like, while the backup RAM 104 is a nonvolatile memory which stores data which must be preserved during stoppage of the engine E. Along with this CPU 101, ROM 102, RAM 103, backup RAM 104, and counter 105 being mutually connected together via a bus 108, they are also connected to an external input circuit 106 and an external output circuit 107.

To the external input circuit 106, there are connected the above described air flow meter 72L for the left side bank, a water temperature sensor 110 which detects the temperature of the cooling water which is circulating in the water jacket of the engine E (the cooling water temperature), a vacuum sensor 111 which detects the intake pressure at the downstream side of the throttle valve 73L for the left side bank 2L, an accelerator position sensor 112 which detects the accelerator opening amount, a throttle position sensor 113 which detects the opening amount of the throttle valve 73L for the left side bank 2L, a crank position sensor 114 which produces a pulse signal according to the engine speed of the crank shaft C, a cam position sensor 115 which produces a pulse signal according to the engine speed of the cam shaft 35L for the left side bank 2L, an ignition switch 116, and the like.

To the external output circuit 107, there are connected the injector 81L for the left side bank 2L, an igniter 117 which operates the spark plugs of the left side bank 2L, a throttle motor 118 which operates the throttle valve 73L of the left side bank 2L, a starter motor 119 for performing cranking operation during engine starting, a valve motor 121 which drives the above described resonance valve 77 to open and close, and the like.

And the ECU 100L performs various types of control for the engine E, including opening and closing control of the injector 81L for the left side bank 2L (injection start timing and injection end timing for fuel), based upon the outputs of the various sensors, such as the above described water temperature sensor 110, vacuum sensor 111, accelerator position sensor 112, throttle position sensor 113, crank position sensor 114, cam position sensor 115, and the like. Furthermore, the ECU 100L recognizes the engine speed based upon the output of the above described crank position sensor 114, and, if this engine speed is in the resonant supercharging region—for example in a region in which it is feared that it will not be possible sufficiently to obtain the beneficial effects of inertial supercharging, so that this is an engine speed region in which the torque may drop—then it is arranged for the ECU 100L to drive the valve motor 121 so as to open the resonance valve 77.

It should be understood that the ECU 100R for the right side bank 2R has the same structure as well, and it performs various types of control for the engine E, including opening and closing control for the injector 81R for the right side bank 2R. Furthermore, this ECU 100R for the right side bank 2R need not necessarily be connected to the starter motor 119 or the valve motor 121; it would also be acceptable to arrange for the drive control of this starter motor 119 and valve motor 121 to be performed by the ECU 100L for the left side bank 2L.

Resonant Supercharging Operation

Next, the operation of this engine E which has a structure like that described above for resonant supercharging will be explained.

When the engine speed as detected according to the signal from the crank position sensor 114 reaches an engine speed region in which it is considered that the beneficial effects of resonant supercharging are required, the ECU 100L drives the valve motor 121. Due to this, the resonance valve 77 is opened. Along with this opening operation of the resonance valve 77, the pressure (intake pulsations) in the surge tanks 74L, 74R which are provided to the banks 2L, 2R come to operate on the two sides of the plate member 91 of the above described vibration plate unit 90. In concrete terms, on the one hand, the pressure within the surge tank 74L for the left side bank 2L comes to operate upon the surface of the plate member 91 on its upper side in FIG. 3, while pressure within the surge tank 74R for the right side bank 2R comes to operate upon the surface of the plate member 91 on its lower side. Accordingly, if a pressure difference is created between the internal pressures in the surge tanks 74L, 74R, the plate member 91 vibrates according to this pressure difference, and the intake pressure of that surge tank 74L (74R) whose internal pressure is the higher comes to be transmitted to that surge tank 74R (74L) whose internal pressure is the lower. Due to this, the internal pressures of the surge tanks 74L, 74R are equalized, and the beneficial effects of resonant supercharging for the banks 2L, 2R are manifested.

Furthermore, in the situation in which this type of beneficial effect of resonant supercharging is being manifested, the interior of the resonance conduit 76 is partitioned by the vibration plate unit 90 into a space which is connected to the left side bank 2L and a space which is connected to the right side bank 2R, so that a situation does not occur in which the intake air into one of the surge tanks 74L (74R) is inducted into the other one of the surge tanks 74R (74L), which would be undesirable. In other words, since mutual flow of the intake air streams between the banks 2L, 2R does not take place, the amounts of intake air which have been separately detected for each of the banks 2L, 2R at the upstream sides of the surge tanks 74L, 74R are sucked just as they are into the cylinders of the banks 2L, 2R, and fluctuation of these amounts of intake air does not occur. The fuel injection amounts from the injectors 81L, 81R for each of the banks 2L, 2R are set by the ECUs 100L, 100R according to the amounts of intake air which have been detected by the respective air flow meters 72L, 72R of each of the banks 2L, 2R. Due to this, because of the fact that, as explained above, these amounts of intake air do not fluctuate, if the fuel injection amounts from the injectors 81L, 81R are set according to the amounts of intake air which have been detected by the air flow meters 72L, 72R, then it becomes possible to make the actual air/fuel ratios (A/F) of each of the banks 2L, 2R approach the target A/Fs with high accuracy.

Since, as described above, in this embodiment, even for an engine E which is provided with independent air-intake systems for each of the banks 2L, 2R, it is arranged for it to be possible only to transmit pressure between the banks 2L, 2R via the resonance conduit 76, accordingly it is possible to make maintenance of adequate air/fuel ratios be compatible with obtaining the high beneficial effects of resonant supercharging. In other words, since it is possible to eliminate deviation of the air/fuel ratios for the banks 2L, 2R, accordingly it is possible to anticipate enhancement of the output of the engine, and furthermore it is possible to obtain an adequate performance from the engine while maintaining the temperature of the catalytic converter which is provided to the exhaust system at an appropriate temperature; and, moreover, it is possible to avoid the phenomenon of deterioration of the ignition characteristic of the mixture gas caused by the spark plugs getting into the state of being wetted with fuel in the liquid phase (the so called flooded state of the spark plugs).

OTHER EMBODIMENTS

In the embodiment explained above, the case of application of the present invention to a V-type engine E for an automobile was explained. However, the present invention is not to be considered as being limited to this case; it could also be applied to a horizontally opposed type engine for an automobile, or the like. Moreover, the present invention is not to be considered as being limited to the case of a gasoline engine; it could also be applied to a diesel engine. Yet further, the present invention is not limited to use for an automobile; it could also be applied to some other type of engine. Even further, the specification of the engine, such as its number of cylinders, its fuel injection method, and so on is not to be considered as being particularly limited.

Moreover although, in the embodiment described above, the plate member 91 of the vibration plate unit 90 was made from metal, this is not limitative; it would also be acceptable to arrange for it to be made from resin, or from wood pulp. In other words, any structure will be acceptable, provided that it is capable of transmitting pressure between the surge tanks 74L, 74R due to shifting or vibrating in the interior of the resonance conduit 76; according to circumstances, it would also be acceptable to arrange for both the above described plate member 91 and also the support member 92 to be made as one unitary element from rubber.

Moreover although, in the embodiment described above, a case was explained in which the present invention was applied to an engine which was provided with two air-intake systems which were mutually independent, since there is a possibility of the same problem as described above (deviation of the A/F) occurring in the case of an air-intake system in which the intake passages are connected together at the upstream sides of the air flow meters 72L, 72R (i.e. which is made with a structure in which the intake passage is branched at the upstream sides of the air flow meters 72L, 72R, and in which the air flow meters 72L, 72R are disposed in these branched off conduits), accordingly it would also be effective to apply the present invention to an air-intake system having this structure.

While the invention has been described with reference to what are considered to be preferred embodiments thereof, it is to be understood that the invention is not limited to the disclosed embodiments or constructions. On the contrary, the invention is intended to cover various modifications and equivalent arrangements. In addition, while the various elements of the disclosed invention are shown in various combinations and configurations, which are exemplary, other combinations and configurations, including more, less or only a single element, are also within the scope of the appended claims.

The invention claimed is:

1. An air-intake device for an internal combustion engine, comprising:
    a plurality of cylinder groups;
    intake passages that provided for each of the cylinder groups and are mutually independent;
    a resonant supercharging device that includes a resonance passage joining between the intake passages for each of the plurality of cylinder groups and an opening and closing valve provided in the resonance passage;
    a control device that performs control so as to be capable of adjusting an air/fuel ratio of mixture gas to each of the plurality of cylinder groups according to amount of intake air sucked into each of the intake passages; and
    a vibration plate that is provided within the resonance passage, and that is capable of mutual transmission of pressure between the intake passages of the plurality of cylinder groups, while always intercepting mutual flow of intake air between the intake passages of the plurality of cylinder groups.

2. The air-intake device for the internal combustion engine according to claim 1, further comprising:
    intake air amount detection means for each of the plurality of cylinder groups, for detecting the amount of intake air being sucked from one of the intake passages; wherein
    fuel injection amount for each of the plurality of cylinder groups is set and the air/fuel ratio is adjusted, according to the detected amount of intake air.

3. The air-intake device for the internal combustion engine according to claim 1, wherein
    the resonance passage is provided so as to mutually connect between surge tanks, one of which is provided for the intake passage of each of the plurality of cylinder groups.

4. The air-intake device for the internal combustion engine according to claim 1, wherein
    the vibration plate includes a plate member which is made from metal, resin, or wood pulp, and a support member which has flexibility, approximately the entirety of the outer peripheral edge of the plate member is supported by inner circumferential surface of the resonance passage via the support member, the plate member reciprocates within the resonance passage so as to equalize pressures in the intake passages of each of the plurality of cylinder groups, while the support member deforms elastically according to pressure difference within the resonance passage on both sides of the plate member.

5. The air-intake device for the internal combustion engine according to claim 1, further comprising:
    an intake air amount detector for each of the plurality of cylinder groups, which detects the amount of intake air being sucked from one of the intake passages; wherein
    fuel injection amount for each of the plurality of cylinder groups is set and the air/fuel ratio is adjusted according to the detected amount of intake air.

* * * * *